United States Patent
Soma et al.

(10) Patent No.: US 11,671,876 B2
(45) Date of Patent: Jun. 6, 2023

(54) CLASSIFYING NETWORK TRAFFIC TO USE CELLULAR NETWORK SLICES BASED ON APPLICATION PARAMETERS

(71) Applicant: Dell Products, L.P., Round Rock, TX (US)

(72) Inventors: Dileep Kumar Soma, Austin, TX (US); Anantha K. Boyapalle, Cedar Park, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 44 days.

(21) Appl. No.: 16/888,312

(22) Filed: May 29, 2020

(65) Prior Publication Data

US 2021/0377809 A1    Dec. 2, 2021

(51) Int. Cl.
*H04W 28/24* (2009.01)
*H04L 69/22* (2022.01)
*H04L 47/2441* (2022.01)
*H04W 12/42* (2021.01)

(52) U.S. Cl.
CPC ......... *H04W 28/24* (2013.01); *H04L 47/2441* (2013.01); *H04L 69/22* (2013.01); *H04W 12/42* (2021.01)

(58) Field of Classification Search
None
See application file for complete search history.

(56) References Cited

U.S. PATENT DOCUMENTS

| | | | |
|---|---|---|---|
| 2020/0296615 A1* | 9/2020 | Yang | H04L 43/08 |
| 2020/0323038 A1* | 10/2020 | Dahan | H04L 41/0816 |
| 2020/0359284 A1* | 11/2020 | Chen | H04W 36/0022 |
| 2020/0383006 A1* | 12/2020 | Trivisonno | H04M 15/66 |
| 2020/0396745 A1* | 12/2020 | Hidayat | H04L 43/16 |
| 2021/0037542 A1* | 2/2021 | Wang | H04W 4/46 |
| 2021/0084542 A1* | 3/2021 | Ahmad | H04W 4/025 |
| 2021/0119941 A1* | 4/2021 | Hoole | H04W 28/0289 |
| 2021/0152615 A1* | 5/2021 | Karampatsis | H04L 65/1069 |
| 2021/0359912 A1* | 11/2021 | Tervonen | H04W 48/18 |

* cited by examiner

*Primary Examiner* — Marcus Smith
(74) *Attorney, Agent, or Firm* — Fogarty LLP

(57) ABSTRACT

Systems and methods for classifying network traffic to use cellular network slices based on application parameters are described. In some embodiments, an Information Handling System (IHS) may include: a processor and a memory coupled to the processor, the memory having program instructions stored thereon that, upon execution, cause the IHS to: receive a plurality of packets originated by a single application; classify each of the plurality of packets into one of a plurality of network slices based upon network parameters of the application, where each of the network slices is associated with a weight, and for each given packet among the plurality of packets, add a weight to a header portion of the given packet, where the weight corresponds to the given packet's classification.

20 Claims, 6 Drawing Sheets

| | | | OBSERVED ANALYSIS OF APPLICATIONS (INPUT PARAMETERS) | | | | | | |
|---|---|---|---|---|---|---|---|---|---|
| APPLICATION | EXAMPLE | DETAILS | CLASSIFICATION (OUTPUT) | MAX THROUGHPUT | AVERAGE THROUGHPUT | TIME BETWEEN PACKETS (ms) - LOW | TIME BETWEEN PACKETS (ms) - AVERAGE | PACKET SIZE | TCP/ UDP | IP HEADERS |
| APPLICATION A | CHROME | CNN VIDEO | VIDEO | 18 | 0.1 | 3 | 1520 | 1500 | TCP | TTL |
| APPLICATION B | CHROME | GAME TRAFFIC | VOICE | 1 | 0.3 | 3 | 30 | 120 | UDP | OPTIONAL PARAMETERS |
| APPLICATION C | WINDOWS UPDATE | | BACKGROUND | 22 | 0.1 | 2 | 18000 | 1500 | TCP | CHECKSUM |
| APPLICATION D | GAME | FORZA STREET | VOICE | 2.1 | 0.4 | 1 | 16 | 82 | TCP | IDENTIFICATION |
| APPLICATION E | CHROME | NYTIMES | BEST EFFORT | 7 | 0.08 | 2 | 3500 | 1450 | TCP | |

FIG. 8

CLASSIFYING NETWORK TRAFFIC TO USE CELLULAR NETWORK SLICES BASED ON APPLICATION PARAMETERS

FIELD

This disclosure relates generally to Information Handling Systems (IHSs), and more specifically, to systems and methods for classifying network traffic to use cellular network slices based on application parameters.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communication through a network to a server IHS to retrieve and store information. Different types of networks support different types of communication at different data transfer rates. Example of networks include, but are not limited to, the Internet, the public switched telephone network (PSTN), and the wireless radio networks of cell phone telecommunication providers.

Fifth generation (5G) cellular networks have their service areas divided into smaller geographical areas or "cells." Wireless devices located in a cell connect to the 5G network by radio waves through an antenna. Unlike its predecessors, 5G networks support very large bandwidth communications, of up to 10 gigabits per second, and make new applications possible. 5G also introduces the concept of cellular network slicing. Specifically, 5G network slicing enables the multiplexing of virtualized and independent logical networks on the same physical network infrastructure. Each network slice is an isolated end-to-end network tailored to fulfil diverse Quality-of-Service or "QoS" requirements requested by a given application.

As the inventors hereof have recognized, however, classifying applications to use network slices is currently a manual tagging process based on static lists. For newly released applications or for applications without pre-defined QoS requirements, classifying traffic can be a problem. Moreover, as the inventors hereof have determined, a single application may be suitable for using different network slices with different QoS based on what types of operations that application is performing, which is not possible with conventional network slicing techniques.

To address these, and other problems, the inventors hereof have developed systems and methods for classifying network traffic to use cellular network slices based on application parameters.

SUMMARY

Embodiments of systems and methods for classifying network traffic to use cellular network slices based on application parameters are described. In an illustrative, non-limiting embodiment, an Information Handling System (IHS) may include: a processor and a memory coupled to the processor, the memory having program instructions stored thereon that, upon execution, cause the IHS to: receive a plurality of packets originated by a single application, classify each of the plurality of packets into one of a plurality of network slices based upon network parameters of the application, where each of the network slices is associated with a weight, and for each given packet among the plurality of packets, add a weight to a header portion of the given packet, where the weight corresponds to the given packet's classification.

Each of the plurality of network slices may have a different quality-of-service (QoS) capability. The application may have a QoS requirement and the weight may modify the QoS requirement for the given packet. Moreover, the packet classification may include at least one of: video, voice, background, or best effort. The network parameters may include at least one of: maximum throughput, average throughput, low time-between packets, average time-between packets, packet size, type of protocol, or header parameters.

The classification may be based upon a machine learning (ML) algorithm that receives a packet and associates the packet with a corresponding network slice based upon previously collected network parameters. The program instructions, upon execution, cause the IHS to transmit the given packet over a selected link of a multi-link Virtual Private Network (VPN), where the link is selected based upon the weight. The multi-link Virtual Private Network (VPN) may be established, at least in part, over a fifth generation (5G) technology cellular network. The program instructions, upon execution, may also cause the IHS to, for each given packet among the plurality of packets, add a reliability attribute to another header portion of the given packet, where the reliability attribute adds flexibility to the selection of the link based upon the weight.

In another illustrative, non-limiting embodiment, a memory device may have program instructions stored thereon that, upon execution by a processor of an IHS, cause the IHS to: receive a plurality of packets originated by a single application, classify each of the plurality of packets into one of a plurality of network slices based upon network parameters of the application, where each of the network slices is associated with a weight; for each given packet among the plurality of packets, add a weight to a header portion of the given packet, where the weight corresponds to the given packet's classification, and transmit the given packet over a selected link of a multi-link Virtual Private Network (VPN), where the link is selected based upon the weight.

In yet another illustrative, non-limiting embodiment, a method may include: receiving a plurality of packets originated by a single application, classifying each of the plurality of packets into one of a plurality of network slices based upon network parameters of the application, where each of the network slices is associated with a weight; for each given packet among the plurality of packets, adding a weight to a header portion of the given packet, where the weight corresponds to the given packet's classification, and transmitting the given packet over a fifth generation (5G) technology cellular network.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 8 is a table of an example of network traffic classification type for sending/receiving packets based on application parameters, according to some embodiments.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
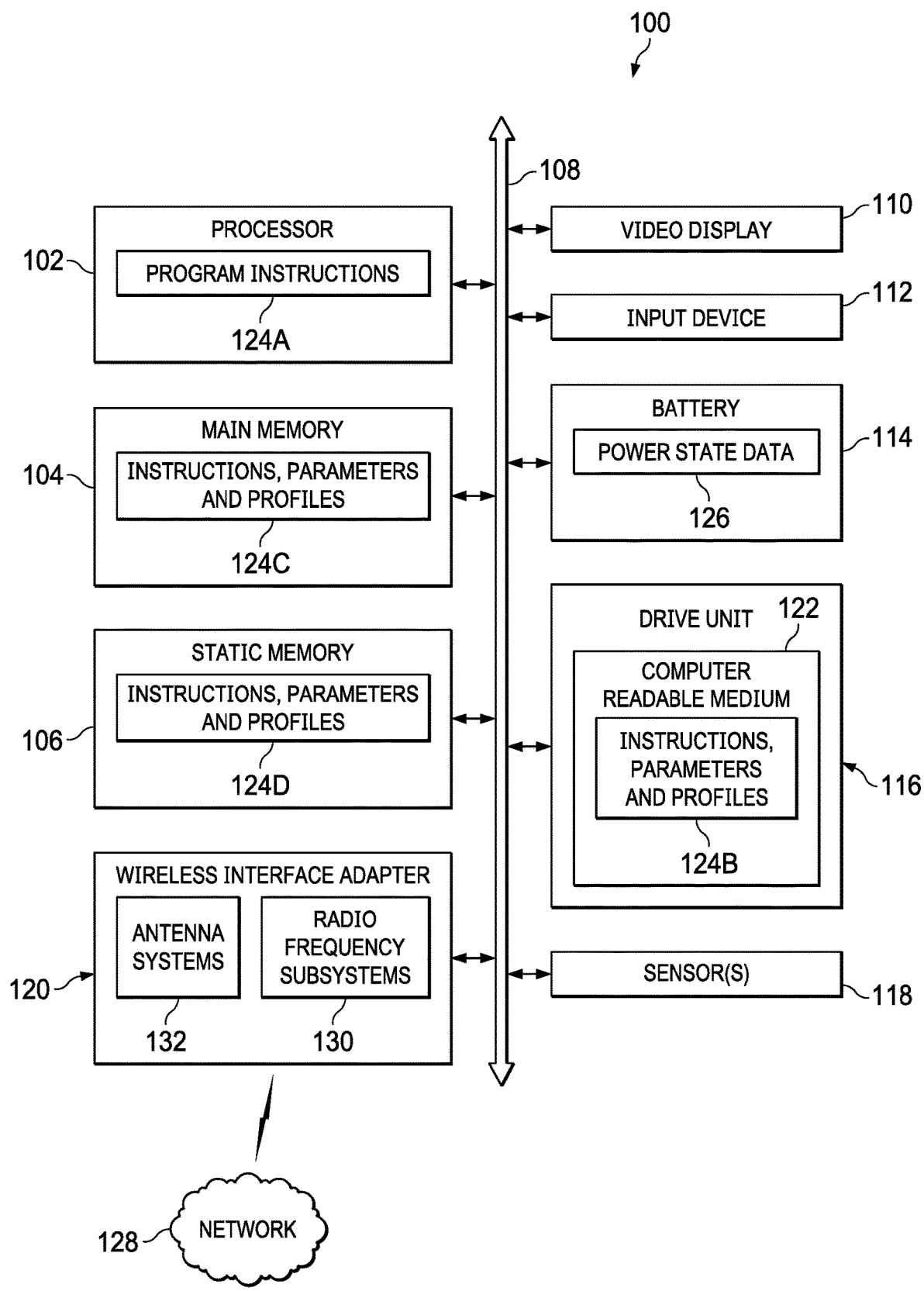
FIG. 1 is block diagram of an example of components of an Information Handling System (IHS) configured to classify network traffic to use cellular network slices based on application parameters, according to some embodiments.

FIG. 1 is block diagram of an example of components of an Information Handling System (IHS) configured to implement systems and methods for classifying network traffic to use cellular network slices based on application parameters. In some embodiments IHS 100 may represent wireless communication devices 210, 220, and 230 or servers or systems 290 located anywhere within network 200 of FIG. 2, including remote data center 286.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a PDA, a mobile IHS, a palmtop computer, a phone, a watch, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specifies actions to be taken by that machine.

Generally speaking, IHS 100 may represent a wireless communication device (e.g., a phone, a tablet, a watch, a laptop, etc.) associated with a user or recipient of intended wireless communication. The wireless communication device may execute instructions via a processor to produce a system for classifying network traffic to use cellular network slices. The system may operate as a software agent, in whole or in part, on the wireless communication device. IHS 100 may also represent a networked server or other system and administer aspects of the system including a concurrent wireless link optimization system via instructions executed on a processor.

As shown in FIG. 1, IHS 100 may include processor 102 such as a central processing unit (CPU), a graphics processing unit (GPU), or both. Moreover, IHS 100 can include main memory 104 and static memory 106 that can communicate with each other via bus 108. As shown, IHS 100 may further include video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to IHS 100. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an A/C power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions that can be executed by processor 102 to cause the computer system to perform any one or more of the methods or operations disclosed herein. For example, instructions 124A may execute a network/communication link aggregation system coupled to a plurality of local area networks/communication links, and configured to provide concurrent wireless access between local area network components or clients, software agents, or other aspects or components. Similarly, instructions 124A may perform the classification network traffic to use cellular network slices.

In some cases, instructions 124A may be executed for establishing classifying network traffic to use 5G cellular network slices. Additionally, or alternatively, instructions 124A may be executed for transmitting and receiving packets from any given application over two or more network slices.

Various software modules comprising program instructions 124A may be coordinated by an OS via an application programming interface (API). Examples of OSs may include WINDOWS, ANDROID, and other OS types known in the art. Examples of APIs include, but are not limited to: Win 32, Core Java API, or Android APIs. In a further example, processor 102 may conduct monitoring and processing of wireless communication device usage trends by IHS 100.

Disk drive unit 116 may include computer-readable medium 122 in which one or more sets of instructions 124B such as software can be embedded. Similarly, main memory 104 and static memory 106 may also contain computer-readable medium for storage of one or more sets of instructions, parameters, or profiles 124D. Disk drive unit 116 and static memory 106 also contain space for data storage. Further, instructions 124B may embody one or more of the methods or logic as described herein.

Wireless link quality or conditions may be monitored and measured by processor 102 during wireless link usage and stored. In a particular embodiment, instructions, parameters, and profiles 124C may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124C.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications. Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over an active SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed Wi-Fi WLAN operation. For instance, a 5 GHz wireless communication frequency band may be apportioned under the 5G standards for communication on either small cell WWAN wireless link operation or Wi-Fi WLAN operation. In another example, wireless adapter 120 may operate a wireless communication link or links in unlicensed spectrum in 4.5G using protocols such as Licensed Assisted Access (LAA) or enhanced LAA (eLAA). In some embodiments, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of HIS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, Wi-Fi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles or it may receive and execute instructions, parameters, and profiles responsive to a propagated signal; so that a device connected to network 128 can communicate voice, video, or data over the network 128. Further, program instructions may be transmitted or received over the network 128 via the network interface device or wireless adapter 120.

IHS 100 includes Basic Input/Output System and firmware (BIOS/FW) code (e.g., instructions 124C in static memory 106). The BIOS/FW code functions to initialize IHS 100 on power up, to launch an operating system, and to manage input and output interactions between the operating system and the other elements of IHS 100. In an embodiment, BIOS/FW code may reside in memory 104, and include machine-executable code that is executed by processor 102 to perform various functions of IHS 100. In another embodiment, application programs and BIOS/FW code reside in another storage medium of IHS 100. For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs and BIOS/FW code can each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory. Additionally, a computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform context-based network traffic classification operations using cellular network slices For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different context-based link aggregation operation and/or use different thresholds for evaluating a point of multi-link advantage.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Moreover, a network traffic classification operation may be performed based on other context information such as the presence or distance of the user with respect to IHS 100 and/or display 110. In these cases, processor 102 may process user presence data received by sensors 118 and may determine, for example, whether an IHS's end-user is present or absent.

In situations where the end-user is present before IHS 100, processor 102 may further determine a distance of the end-user from IHS 100 continuously or at predetermined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, whether IHS 100 is inside or outside of a carrying bag, etc. Moreover, a different network traffic classification operation may be performed based on this context information.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-On-Chip (SOC), or the like.

Figure 2:
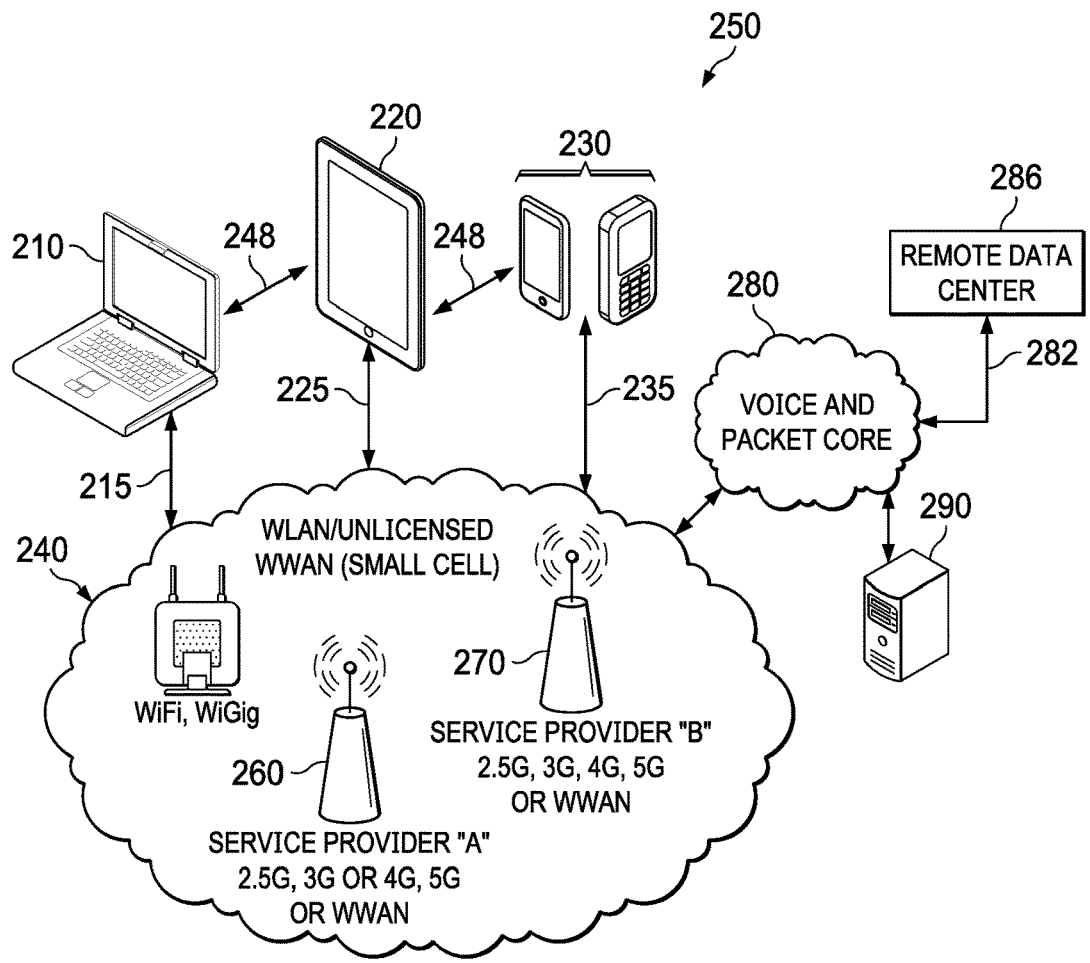
FIG. 2 is block diagram of a network environment where systems and methods for classifying network traffic to use cellular network slices based on application parameters may be implemented, according to some embodiments.

FIG. 2 is block diagram of a network environment where systems and methods for classifying network traffic to use cellular network slices based on application parameters may be implemented. In some embodiments, network 200 may include networked wireless communication devices 210, 220, and 230, wireless network access points, and multiple wireless connection link options. Network 200 may include one or more wired communication devices or links. For example, communication device 210 may include a wired link, such as an Ethernet link. A variety of additional computing resources of network 200 may include client mobile information handling systems, data processing servers 290, network storage devices, local and wide area networks, or other resources as needed or desired.

As depicted, IHSs 210, 220, and 230 may be a laptop computer, tablet computer, or smartphone device. Wireless communication devices 210, 220, and 230 may access a wireless local network 240, or they may access a macro-cellular network 250. In a further example, IHS 230, such as a laptop, may alternatively access local network 240 using a wired link, such as a wired Ethernet connection. In an example, the wireless local network 240 may be the wireless local area network (WLAN), a wireless personal area network (WPAN), or a wireless wide area network (WWAN).

In an embodiment, a standalone mobile IHS 210, 220, or 230 may operate on WLAN such as Wi-Fi or on unlicensed WWAN small cell wireless links such as with small cell unlicensed LTE substations in wireless local network 240. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, networked wireless communication devices 210, 220, or 230 may have a plurality of wireless network interface systems capable of transmitting simultaneously within a shared communication frequency band. Communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Examples of competing protocols may be local wireless network access protocols such as Wi-Fi, WiGig, and small cell WLAN in an unlicensed, shared communication frequency band. Examples of communication frequency bands may include unlicensed 5 GHz frequency bands or 2.5 GHz conditional shared communication frequency bands under FCC Part 96. Wi-Fi ISM frequency bands that could be subject to future sharing include 2.4 GHz, 60 GHz, 900 MHz or similar bands.

Voice and packet core network 280 may contain externally accessible computing resources and connect to a remote data center 286. Voice and packet core network 280 may contain multiple intermediate web servers or locations with accessible data. Voice and packet core network 280 may also connect to other wireless networks similar to 240 or 250 and additional wireless communication devices such as 210, 220, 230 or similar connected to those additional wireless networks.

Connection 282 between wireless network 240 and remote data center 286 or connection to other additional wireless networks may be via Ethernet or another similar connection to the world-wide-web, a WAN, a LAN, another WLAN, or other network structure. Connection 282 may be made via a WLAN access point/Ethernet switch to the external network and be a backhaul connection.

The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network-connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In various implementations, cloud or remote data center 286 or networked server 290 may run hosted applications for systems 210, 220, and 230. For example, remote data center 286, networked server 290, or some combination of both may operate some or all of a plurality of hosted applications. Wireless communication devices 210, 220, and 230 may be configured to run one or more applications locally, and to have hosted applications run in association with the local applications at remote data center 286 or networked server 290. For example, wireless communication devices 210, 220, and 230 may operate some or all of the hosted applications on a remote server via local area network connectivity using cellular network slices after classifying network traffic.

Thus, as illustrated, systems 210, 220, and 230 may be running applications locally while requesting data objects related to those applications from the remote data center 286 via a wireless network. For example, a data storage client application such as Microsoft Sharepoint may run on system 220, and it may be associated with a host application running at remote data center 286 that represents a Sharepoint data storage server. In another example, a web browser application may be operating at system 230, and it may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (Wi-Fi or WiGig), through unlicensed WWAN small cell base stations such as in network 240 or through a service provider tower such as that shown with service provider A 260 or service provider B 270 and in network 250.

In other cases, wireless communication devices 210, 220, and 230 may communicate intra-device via 248 when one or more of wireless communication devices 210, 220, and 230 are set to act as an access point or a WWAN connection via small cell communication or licensed small cell WWAN connections. For example, one of wireless communication devices 210, 220, and 230 may serve as a Wi-Fi hotspot.

Quality-of-Service (QoS), bandwidth, time-of-flight (e.g., following the Fine Time Measurement or "FTM" protocol), and/or speed of wireless links 215, 225, and 235—that is, a link's capabilities—may vary widely depending on several factors including the service provider, the number of wireless communication devices and users in a location, and other factors. Thus, selection of a wireless link among local area network links such as WLAN links may depend on assessment of the link radio frequency conditions. The wireless communication device's operating context can play an important role in determining wireless link conditions. Information about wireless link connection quality and capacity for a service to be used can be advantageous in optimizing traffic classification, cellular network slice selection, and/or multi-link aggregation.

Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. These factors can be specific to the type of wireless service being requested, whether voice, messaging, SMTP, Audio, Video, HTTP or other service types. They can also be specific to the wireless communication device used. In each instance, radio frequency transmission subsystems and controllers operate and consume device power. Based on these, and other factors, systems and methods described herein may automatically select among cellular network slices to optimize radio frequency conditions, traffic conditions, device power consumption, cost, etc.

Figure 3:
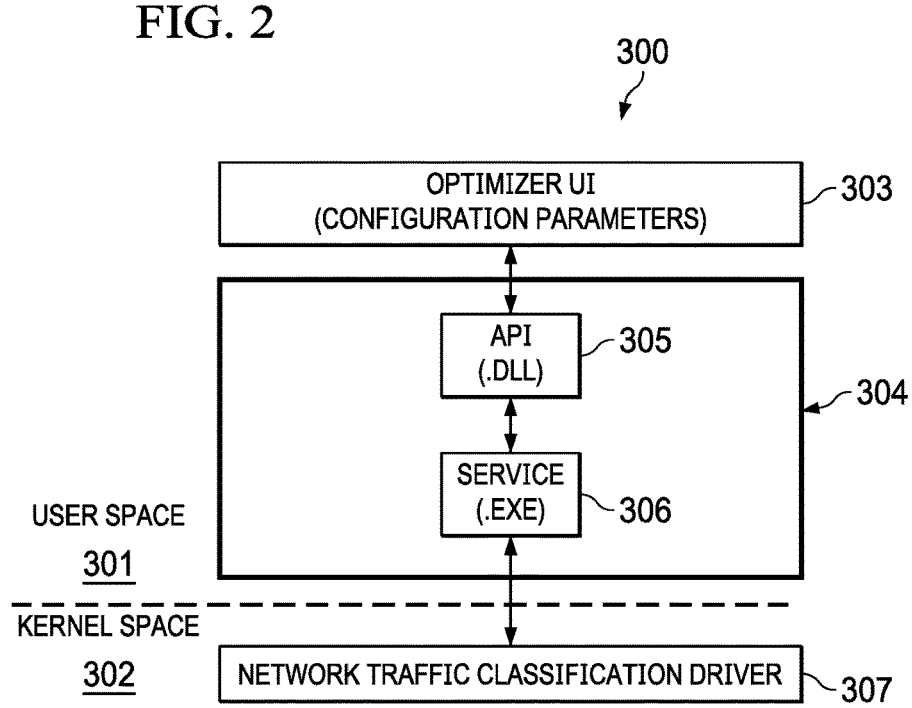
FIG. 3 is a block diagram of a network traffic classification software system, according to some embodiments.

FIG. 3 is a block diagram of network traffic classification software system 300. In some embodiments, system 300 may be instantiated through the execution of program instructions 124A by processor 102 of IHS 100. As shown, optimizer user interface (UI) 303 may provide a graphical UI (GUI) in user space 301 configured to receive one or more configuration parameters. For example, optimizer UI 303 may receive, as configuration parameters, a user's selection of QoS indicator(s), threshold(s), and/or context information (e.g., application type, proximity-based, posture-based, etc.), usable by system 300 to determine when to enable or disable network traffic classification for using cellular network slices in IHS 100.

Optimizer UI passes configuration parameters to OS plug-in module 304, which includes API 305 (a dynamic-link library or DLL, etc.) and OS service 306 (e.g., an executable). In some implementations, OS service 306 may be configured to handle network traffic classification in user space 301. In kernel space 302, network traffic classification driver 307 (e.g., a network filter driver deployed as part of the Windows Filtering Platform (WFP)) may be configured to perform load balancing of packets for cellular network slices under control of OS service 306, according to the configuration parameters received via optimizer UI 303.

In some implementations, system 300 may include machine learning (ML) and/or artificial intelligence (AI) algorithms configured to collect context information such as, for example, RSSI from various APs, ToF from various APs, physical location information (e.g., by GPS), accelerometer data, etc. Software 300 may also include ML and/or AI algorithms configured to store and analyze other context information indicative of user behavior, such applications under execution and their priorities, distance between the user and the IHS, IHS posture or hinge angle, bag status, etc. Moreover, software 300 may be configured to use such information to perform network traffic classification operations that are specific to that context.

Figure 4:
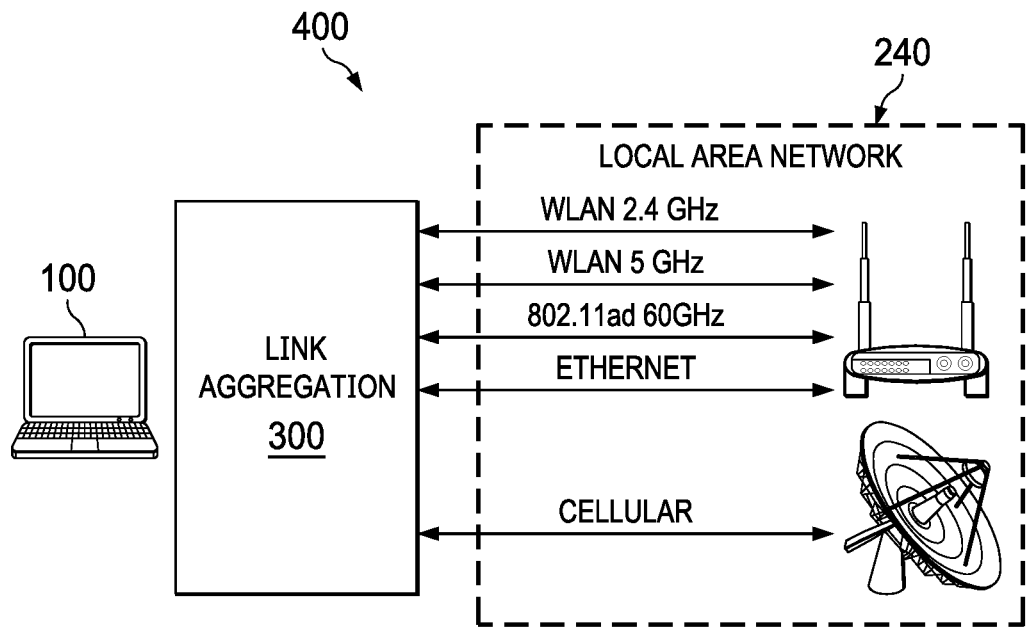
FIG. 4 is a block diagram of an example of a link aggregation system, according to some embodiments.

FIG. 4 is a block diagram of an example of a link aggregation system. Particularly, IHS 100 in environment 400 executes multi-link aggregation software 401 to access local area network 240. Multi-link aggregation software 401 may be configured to determine when to use single or multiple network slices using method 700 of FIG. 7.

Multi-link aggregation software 401 sends and receives information in the form of network packets through an access point of network 240 concurrently through one or more network interfaces, such as a wired network interface (e.g., IP address 192.168.1.2:4243) and a wireless network interface (e.g., IP address 192.168.1.3:4243). These multiple network interfaces are coordinated by software 401 (and another instance of software 401 at the access point), which track coordinated network interfaces using a link aggregation look-up table (LUT) or the like.

Multi-link aggregation software 401 may be configured to manage network packet address translation at the network layer. In one example, multi-link aggregation software 401 coordinates the use of multiple network interfaces without the use of specialized hardware. In another example, a digital signal processor (DSP) integrated into HIS 100 receives network packets from a given application that are prepared to send through a single network interface in a conventional manner. Such an application may have coordinated with an OS to communicate with the Internet through an Ethernet cable.

Multi-link aggregation software 401 receives network packets from an application, selects a network interface and/or network slice to send the network packet, and performs a network layer address translation to insert an Internet Protocol (IP) address of the selected network interface and/or slice into the network packet. Once the network packet is translated to a selected network address, multi-link aggregation software 401 places the network packet into the network interface device associated with the selected network interface and sends the network packet through that network interface to the access point.

Similar handling of incoming network packets provides a given application with access to multiple network interfaces to accept network packets. As network packets arrive at the two interfaces, the network packets are forwarded to multi-link aggregation software 401 where network address translation is performed to insert an IP address in the network layer that is expected by the application. Inbound network packets with the translated network address expected by the application are then forwarded to that application for processing.

As such, an application may be provided with multiple network interfaces through network address translation so that the application views the multiple network interfaces as a single interface. In order to coordinate network communication for the application with an external network, the target of the application network packets should know that network packets from the application have the same source application even though the source IP address reflects different network mediums of the client. For example, the access point may manage the assignment of IP addresses so that an aggregated IP address is presented for the application to the external network.

An access point may assign an IP address to IHS 100 in a conventional manner, such as with a DHCP dynamic address process that leverages a globally unique address provided from an Internet Service Provider or enterprise server or a locally unique IP address like 192.168.x.x. The application coordinates external network communication using a network interface and associated IP address assigned by an operating system. Multi-link aggregation software 401 then coordinates the use of multiple network interfaces by inserting aggregate IP addresses with network address translation.

In an example, multi-link aggregation software 401 associates in a link aggregation LUT the IP addresses of the two selected network interfaces (e.g., 192.168.1.2 and 192.168.1.3) with a port (e.g., 4243). The association is stored in the link aggregation LUT of the access point, where an aggregate IP address (e.g., 41.126.22.35) and port (e.g., 3423) is also associated with the application and used through network address translation to present the application's network packets to an external network as from a same source address.

In some cases, a combination of peer-to-peer, mesh and WLAN network interfaces may all communicate network packets of a client application to a common location outbound to an external network so that one or more network address translations are performed at one more intermediate local area network locations before communication to the external network is performed using a common aggregated network layer IP address. Ultimately, at egress to the external network, multiple IP addresses of the local area network are coupled by the egress device, such as an access point, by advertising the multiple IP addresses as a single public/private IP address.

Figure 5:
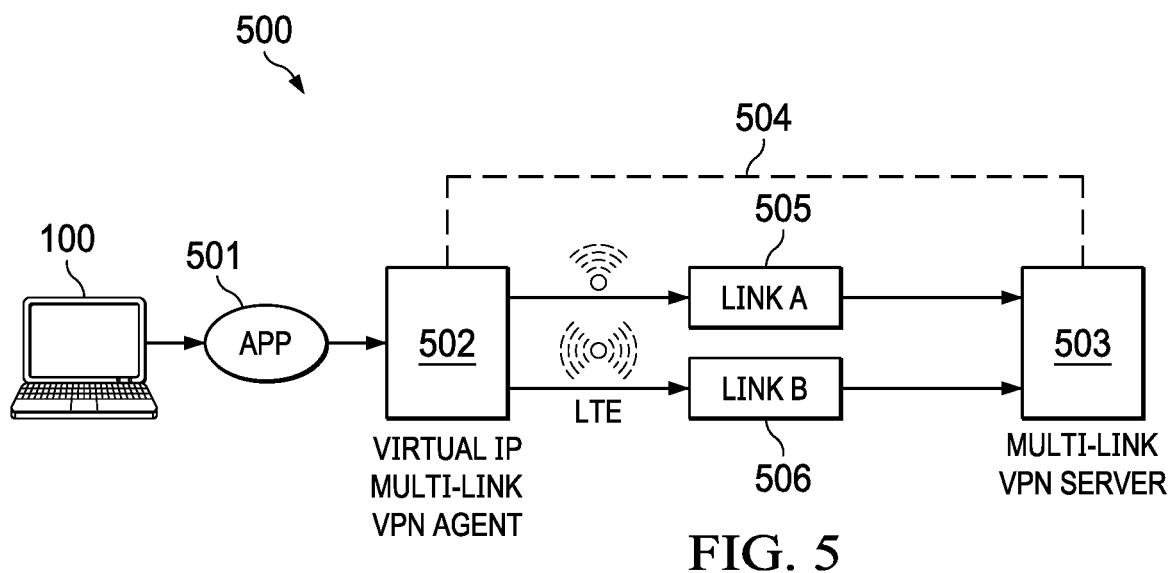
FIG. 5 is a block diagram of an example of a multi-link Virtual Private Network (VPN) system, according to some embodiments.

FIG. 5 is a block diagram of an example of multi-link Virtual Private Network (VPN) system 500. In this embodiment, IHS 100 executes application 501 that produces packets to be transmitted over a VPN connection. Application 501 communicates those packets to virtual IP multi-link VPN agent 502, which may be configured similar to multi-link aggregation software 401 and configured to use link A 505 (e.g., over WiFi) and/or link B 506 (e.g., over LTE) to transmit packets to multi-link VPN server 503.

In some cases, virtual IP multi-link VPN agent 502 and multi-link VPN server 503 main maintain an out-of-band connection 504, for instance, for control and/or management purposes. In operation, virtual IP multi-link VPN agent 502 can distribute packets over link A 505 and link B 506, for example, based upon link speed or uniformly.

Figure 6:
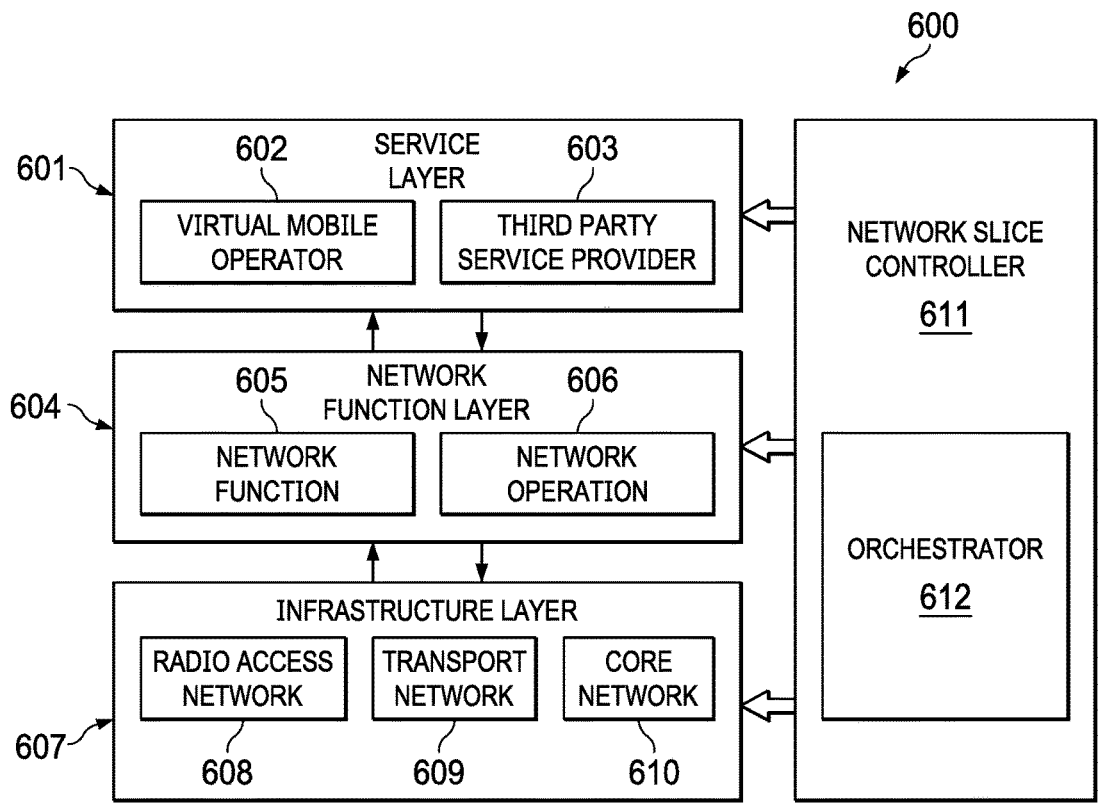
FIG. 6 is a block diagram of an example of a cellular network slicing system, according to some embodiments.

FIG. 6 is a block diagram of an example of cellular network slicing system 600. In some embodiments, system 600 may implement network slicing as well as slice management and configuration. Particularly with respect to network slicing, service layer 601, network function layer 604, and infrastructure layer 607 each contributes to the slice definition and deployment with distinct tasks. Meanwhile, network slice controller 611 operates as a centralized network entity configured to monitor and manage functionalities across layers in order to efficiently coordinate the coexistence of multiple slices.

Service layer 601 includes virtual mobile operator 602 and $3^{rd}$ party service provider 603. Service layer 601 interfaces directly with the network business entities that share the underlying physical network and it provides a unified vision of service requirements. Each service is formally represented as service instance, which embeds all the network characteristics in the form of service-level agreement (SLA) to be satisfied by a suitable slice creation.

Network function layer 604 creates each network slice according to service instance requests coming from service layer 601. It includes a set of network functions 605 that embody pre-defined behaviors and interfaces. Multiple network functions are placed over the virtual network infrastructure and chained together to create an end-to-end network slice that reflects the network characteristics requested by the service. The configuration of network functions 605 is performed by a set of network operations 606 that provides lifecycle management (e.g., from their placement when a slice is first created to their de-allocation when no longer needed).

Infrastructure layer 607 represents the actual physical network topology (radio access network, transport network and core network) upon which every network slice is multiplexed and it provides the physical network resources to host the several network functions composing each slice, including radio access network 608, transport network 609, and core network 610.

Network slice controller 611 operates as a network orchestrator, which interfaces with the various functionalities performed by each of layers 601, 604, and 607 to coherently manage each slice request. Moreover, network slice controller 611 enables reconfiguration of network slices during their lifecycle.

Operationally, network slice controller 601 may be in charge of several tasks that provide a more effective coordination between the aforementioned layers, including, but not limited to: end-to-end service management (mapping of the various service instances in terms of SLA requirements with suitable network functions capable of satisfying service constraints), virtual resources definition (virtualization of the physical network resources in order to simplify the resources management operations performed to allocate network functions), and slice life-cycle management (slice performance monitoring across all layers 601, 604, and 607 in order to dynamically reconfigure each slice to accommodate SLA modifications).

Figure 7:
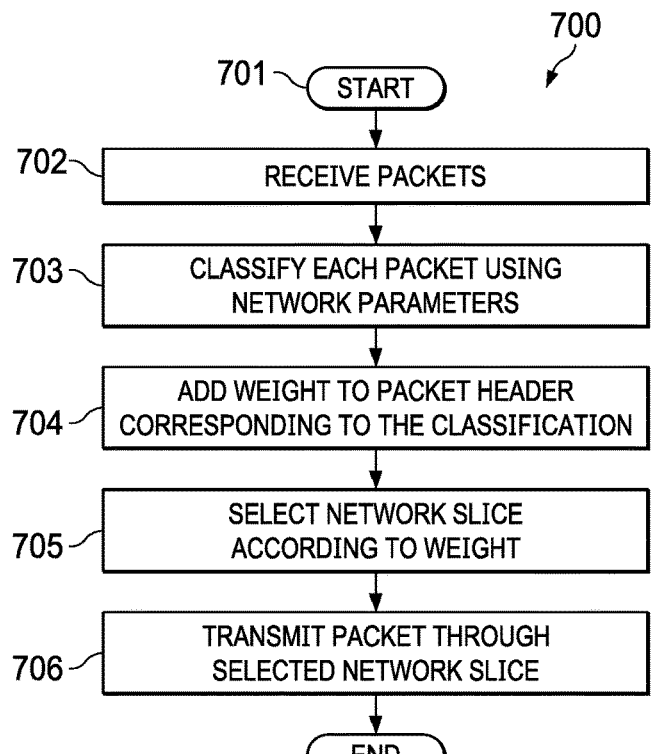
FIG. 7 is a flowchart of an example of a method for classifying network traffic to use cellular network slices based on application parameters, according to some embodiments.

FIG. 7 is a flowchart of an example of method 700 for classifying network traffic to use cellular network slices based on application parameters. In some embodiments, method 700 may be performed, at least in part, by network traffic classification system 300 implemented in connection with multi-link aggregation software 401, virtual IP multi-link VPN agent 502, and/or cellular network slicing system 600.

Particularly, method 700 starts at block 701. At block 702, method 700 receives one or more packets from a given application for transmission over a network, such as, for example, a 5G network with network slicing capabilities. In some cases, the application may be executed in the context of a VPN connection, or the like. At block 703, method 700 may classify each packet using collected network parameters.

To illustrate the operations of block 703, FIG. 8 shows table 800 of an example of network traffic classification type for sending/receiving packets based on application parameters. In some embodiments, block 703 may collect information from each packet produced by each of applications A-E (or different instance of a same application), including the type of application (e.g., Chrome, Windows Update, Game, etc.), additional details about the application when available (e.g., CNN video, game traffic, Forza Street, Nytimes, etc.), as well as a classification of the packet (e.g., video, voice, background, best effort, etc.). For each application, measured parameters may include, for e: maximum throughput, average throughput, time between packets (low), time between packets (average), packet size, TCP/UPD, and/or IP headers (e.g., TTL, checksum, identification, etc.).

Figure 9:
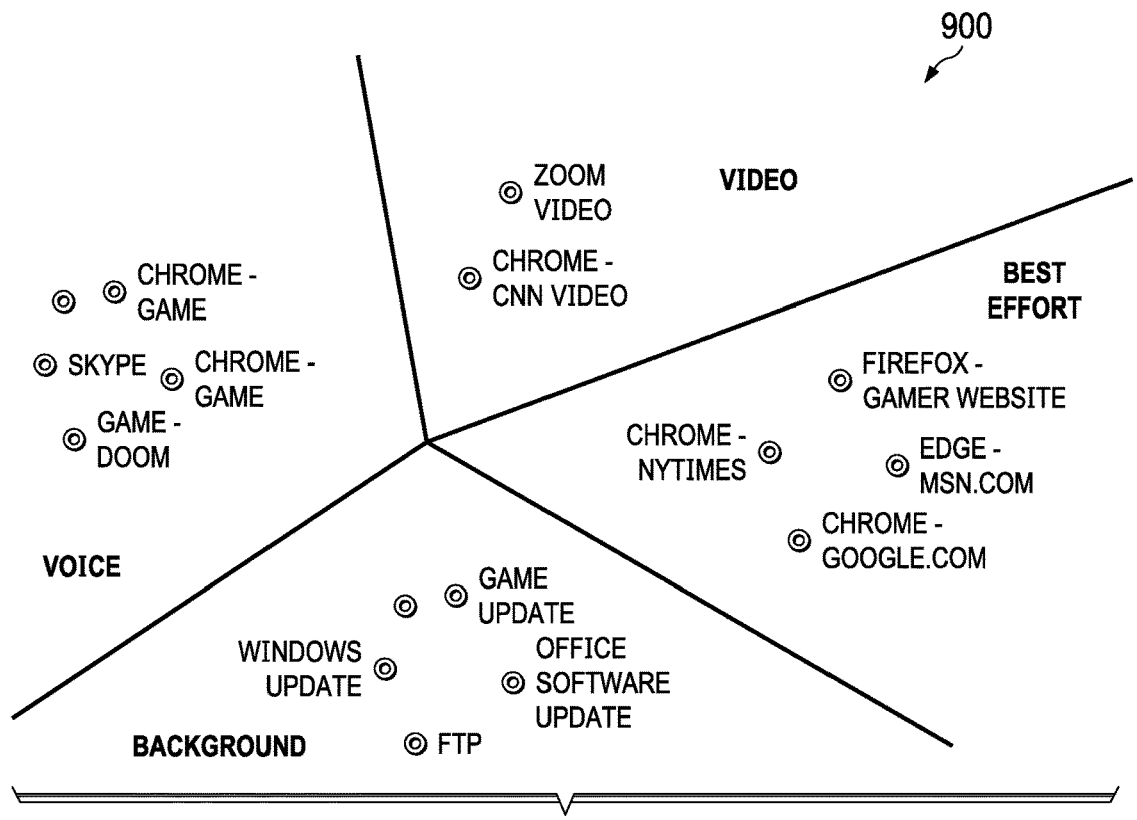
FIG. 9 is a diagram of an example of network traffic classification, according to some embodiments

Still at block 703, a new packet may be classified according to where its parameters fall with respect to the observed analysis of table 800. FIG. 9 shows a diagram 900 of an example of network traffic classification made by block 703. In this particular example, there are 4 different possible classification for any given packet: voice, video, background, and best effort. It should be noted, however, that other classifications are possible.

For example, if an application is identified as a game or conferencing application with one or more packets carrying voice information (e.g., browser games, game applications, voice conference applications, etc.), and/or if those packets have parameters than match a voice type of application in table 800, those packets may be classified as voice packets. If an application is identified as video conferencing or video streaming application with one or more packets carrying video information (e.g., browser video, video conferencing applications, video streaming applications, etc.), and/or if those packets have parameters than match a video type of application in table 800, those packets may be classified as video packets. If an application is identified as background application with one or more packets carrying software update or file transfer information (e.g., game update, office software update, operating system update, etc.), and/or if those packets have parameters than match a background type of application in table 800, those packets may be classified as background packets. Moreover, if an application is not identified as any predefined type of application (e.g., web browser without video or audio content), and/or if those packets have parameters than match a best effort type of application in table 800, those packets may be classified as best effort packets.

In various implementations, the classification operations of block 703 may be performed using ML or AI algorithms, which may be trained using historical data as inputs. Such an ML or AI classifier may be used for application (or multiple instances of an application) based on network characteristics of the application. The ML or AI classifier may automatically segment an application into different network slices based upon network characteristics learned from observing previous network transactions. This implementation augments any manual classification of applications, and accounts for new applications that are being added without having to roll out an update of whitelists/LUTs. For example, an ML classifier may be deployed as a software service that collects traffic statistics from a network filter driver (e.g., network traffic classification driver 307 in FIG. 3) or the like.

Referring back to FIG. 7, at block 704 method 700 adds a weight to each outcoming packet's header portion, such that the weight corresponds to the packet's classification. For example, in the case where the available classifications are: image, video, data, and advertisement classifications: image traffic may receive a first weight (W1), video traffic may receive a second weight (W2), data traffic may receive a third weight (W3), and ad traffic may receive a fourth weight (W4).

At block 705, method 700 selects a network slice for each packet according to the packet's weight. For example, a network slice with a high QoS capability may be selected for transmitting a video packet with a first weight in its header, a different network slice with a medium QoS capability may be selected for transmitting a voice packet with a second weight in its header, yet a different network slice with a low QoS capability may be selected for transmitting a background packet with a third weight in its header, and the best available network slice may be selected for transmitting a best effort packet with a fourth weight in its header, for example, using a water filling method or the like.

Figure 10:
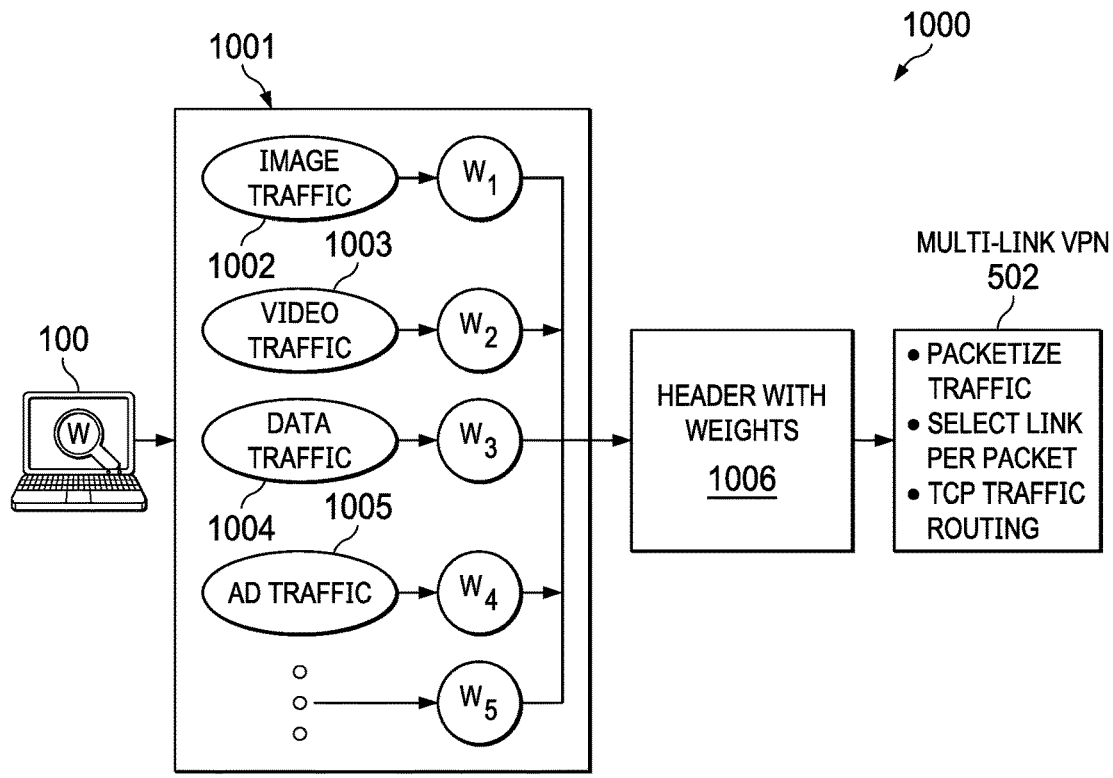
FIG. 10 is a diagram of an example of weights assigned to different types of traffic in a multi-link Virtual Private Network (VPN), according to some embodiments.

At block 706, method 700 transmits each packet through its selected network slice, for example, as shown in FIG. 10, with diagram 1000 representing examples of weights assigned to different types of traffic in a multi-link VPN. In some embodiments, a single application executed by IHS 100 may produce packets classified as 1002-1005, and each packet may receive a corresponding weight at the kernel level. IHS 100 adds those weights to their respective headers, and multilink VPN 502 selects a different link per packet, each link corresponding to the packet header's weight. Method 700 ends at block 707.

In some cases, method 700 may enable the adaptive classification of packets (sub-traffic) of a new application or existing application that has changes (e.g., URLs) to optimize client IHS's QoS using 5G network slices, without base station QoS information. Moreover, method 700 may distinguish different types of traffic associated with application(s) (or instances thereof) and it may assign normalized weights to sub-system traffic. For example, a new name value pair associated with a classification weight may be inserted into the IP header of a packet in layer-3 and the value may be read by multi-link VPN which is used to direct traffic on appropriate link (e.g., ethernet/WIFI/5G etc.).

According to various systems and methods described herein, application(s) executed by IHS 100 may different functionality and different requirements. Each application may have different reliability needs, priorities, latency, etc. (QoS requirements) in order to provide better experience to the end user. Also, each application may have different types of traffic associated with it (e.g., audio and video for a video conferencing call etc.). Yet conventional multi-link level mechanisms distribute oncoming packets over available links without considering their specific requirements.

In contrast, systems and methods described herein may assign weights to each sub-system traffic in the application and assign a weight value in the IP header of the packet. A multi-link VPN is made capable of reading the weight value in the IP header and direct the traffic in appropriate link or network slice available to it.

Parameters that may dictate an application QoS may include, for example: priority, bitrate for each of the application's subsystems, latency, and/or reliability (the reliability attribute gives an application the ability to be flexible or rigid in terms of link or network slice selection for its packets). This information may be fed into the network filter driver which uses weights for each attribute and scores each application. In some cases, specific weight values may be empirically determined and/or left as design consideration.

As such, these systems and methods may add weights to the type of traffic (e.g., a video call may have multiple traffic types: audio data and video data; and a website can serve different types of traffic: image traffic, video traffic and data traffic etc.), associated to the apps per QoS metric, and it may prioritize traffic over a multi-link VPN. The multi-link VPN may: packetize the traffic per sub-components associated with the application(s) and send the traffic over appropriate link using a network filter driver or the like, select a link per packet, and re-order the network traffic on the multi-link server when directing the traffic. In some cases, application of blind waterfilling to low round-trip-time (RTT) network with multi-link VPN without application context may be performed.

In some cases, context information may be used, in addition to network parameters, in order to classify a packet. For example, one or more weights W1-W4 in FIG. 10 may assume a different value depending upon the physical distance between the user and IHS 100. In response to a distance between the user and IHS 100 being smaller than a selected value (e.g., near-field), a video packet may receive a greater weight than a voice packet, which may generally cause the video packet to be transmitted over a 5G network slice with a higher QoS capability than the voice packet. Conversely, in response to the distance being greater than the selected value (e.g., far-field), the video packet may receive a smaller weight than a voice packet, which may generally cause the video packet to be transmitted over a different 5G network slice with a lower QoS capability than the voice packet's network slice.

Additionally, or alternatively, in response to IHS 100 being in a first posture (e.g., laptop mode, tablet mode, display mode, etc.), one or more weights W1-W4 in FIG. 10 may also assume a different value. For example, in a posture that is more conducive for reproducing video content (e.g., display mode, landscape orientation, etc.), video packets may receive a higher weight, and in a different posture or orientation that is less conducive for reproducing video content (e.g., IHS 100 is a laptop with its display closed shut or a hinge angle is smaller than a predetermined value), video packets may receive a lower weight.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive a plurality of packets originated by a single application, wherein the single application includes a plurality of application types;
classify each of the plurality of packets into one of a plurality of network slices based upon application type of the application and network parameters of the application, wherein each packet classification comprises at least one of: video, voice, background, or best effort, and wherein each of the network slices is associated with a weight; and
for each given packet among the plurality of packets, add a weight to a header portion of the given packet, wherein the weight corresponds to the given packet's classification.

2. The IHS of claim 1, wherein each of the plurality of network slices has a different quality-of-service (QoS) capability.

3. The IHS of claim 1, wherein the application has a QoS requirement and wherein the weight modifies the QoS requirement for the given packet.

4. The IHS of claim 1, wherein the network parameters comprise at least one of: maximum throughput, average throughput, low time-between packets, average time-between packets, packet size, type of protocol, or header parameters.

5. The IHS of claim 1, wherein the classification is based upon a machine learning (ML) algorithm that receives a packet and associates the packet with a corresponding network slice based upon previously collected network parameters.

6. The IHS of claim 1, wherein program instructions stored thereon that, upon execution, cause the IHS to:
transmit the given packet over a selected link of a multi-link Virtual Private Network (VPN), wherein the link is selected based upon the weight.

7. The IHS of claim 6, wherein the multi-link Virtual Private Network (VPN) is established, at least in part, over a fifth generation (5G) technology cellular network.

8. The IHS of claim 6, wherein the program instructions, upon execution, cause the IHS to, for each given packet among the plurality of packets, add a reliability attribute to another header portion of the given packet, wherein the reliability attribute adds flexibility to the selection of the link based upon the weight.

9. A memory device having program instructions stored thereon that, upon execution by a processor of an Information Handling System (IHS), cause the IHS to:

receive context information from sensors coupled to the IHS, wherein the context information includes a posture of the IHS;

receive a plurality of packets originated by a single application;

classify each of the plurality of packets into one of a plurality of network slices based upon network parameters of the application and the context information, wherein each of the network slices is associated with a weight;

for each given packet among the plurality of packets, add a weight to a header portion of the given packet, wherein the weight corresponds to the given packet's classification, wherein the weight is modified based upon the posture of the IHS; and transmit the given packet over a selected link of a multi-link Virtual Private Network (VPN), wherein the link is selected based upon the weight.

10. The memory device of claim 9, wherein each of the plurality of network slices has a different quality-of-service (QoS) capability, and wherein the application has a QoS requirement and wherein the weight modifies the QoS requirement for the given packet.

11. The memory device of claim 9, wherein each packet classification comprises at least one of: video, voice, background, or best effort, and wherein the network parameters comprise at least one of: maximum throughput, average throughput, low time-between packets, average time-between packets, packet size, type of protocol, or header parameters.

12. The memory device of claim 11, wherein the classification is based upon a machine learning (ML) algorithm that receives a packet and associates the packet with a corresponding network slice based upon previously collected network parameters.

13. The memory device of claim 9, wherein the multi-link Virtual Private Network (VPN) is established, at least in part, over a fifth generation (5G) technology cellular network.

14. The memory device of claim 9, wherein the program instructions, upon execution, cause the IHS to, for each given packet among the plurality of packets, add a reliability attribute to another header portion of the given packet, wherein the reliability attribute adds flexibility to the selection of the link based upon the weight.

15. A method, comprising:

receiving context information from sensors coupled to an Information Handling System (IHS), wherein the context information includes, at least in part, a distance or proximity between a user and the IHS;

receiving a plurality of packets originated by a single application;

classifying each of the plurality of packets into one of a plurality of network slices based upon network parameters of the application and the context information, wherein each of the network slices is associated with a weight;

for each given packet among the plurality of packets, adding a weight to a header portion of the given packet, wherein the weight corresponds to the given packet's classification, wherein the weight is modified based upon the distance or proximity between the user and the IHS; and transmitting the given packet over a fifth generation (5G) technology cellular network.

16. The method of claim 15, wherein each of the plurality of network slices has a different quality-of-service (QoS) capability, wherein the application has a QoS requirement and wherein the weight modifies the QoS requirement for the given packet, wherein each packet classification comprises at least one of: video, voice, background, or best effort, and wherein the network parameters comprise at least one of: maximum throughput, average throughput, low time-between packets, average time-between packets, packet size, type of protocol, or header parameters.

17. The method of claim 15, wherein the classification is based upon a machine learning (ML) algorithm that receives a packet and associates the packet with a corresponding network slice based upon previously collected network parameters.

18. The method of claim 15, wherein transmitting the given packet over the 5G technology cellular network further comprises transmitting the given packet over a selected link of a multi-link Virtual Private Network (VPN), wherein the link is selected based upon the weight.

19. The method of claim 15, further comprising, for each given packet among the plurality of packets, adding a reliability attribute to another header portion of the given packet, wherein the reliability attribute adds flexibility to the selection of the link based upon the weight.

20. The method of claim 15, wherein the weight is modified based on the distance between the user and the IHS relative to a threshold distance.

* * * * *